United States Patent
Mori

(10) Patent No.: US 7,736,220 B2
(45) Date of Patent: Jun. 15, 2010

(54) COMPUTER PROGRAM PRODUCT

(75) Inventor: Kazuhiro Mori, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 867 days.

(21) Appl. No.: 10/245,311

(22) Filed: Sep. 18, 2002

(65) Prior Publication Data

US 2003/0073473 A1  Apr. 17, 2003

(30) Foreign Application Priority Data

Sep. 19, 2001  (JP) .............................. 2001-285963

(51) Int. Cl.
| | |
|---|---|
| A63F 9/14 | (2006.01) |
| A63F 13/02 | (2006.01) |
| A63F 13/06 | (2006.01) |
| A63F 13/10 | (2006.01) |

(52) U.S. Cl. .............................. 463/6; 463/23; 463/30; 463/32

(58) Field of Classification Search ............ 463/6, 463/58–69, 30–32, 23; 434/62–70, 72, 305, 434/373; 345/672, 677, 678, 680, 681, 682, 345/683, 687

See application file for complete search history.

(56) References Cited

U.S. PATENT DOCUMENTS

| | | | | |
|---|---|---|---|---|
| 3,120,389 | A * | 2/1964 | Lombard ...................... | 463/61 |
| 3,171,215 | A * | 3/1965 | Glass et al. .................... | 434/63 |
| 4,148,485 | A |   4/1979 | Rains | |
| 4,210,084 | A * | 7/1980 | Peltie ........................... | 104/178 |
| 4,349,744 | A * | 9/1982 | Reuther et al. ............ | 290/40 C |
| 4,439,989 | A * | 4/1984 | Yamakawa ................... | 60/718 |
| 4,500,868 | A * | 2/1985 | Tokitsu et al. .............. | 340/439 |
| 4,679,789 | A * | 7/1987 | Okada .......................... | 463/23 |
| 5,269,687 | A * | 12/1993 | Mott et al. .................... | 434/69 |
| 5,368,484 | A * | 11/1994 | Copperman et al. .......... | 434/69 |

(Continued)

FOREIGN PATENT DOCUMENTS

CN  1152729 C  6/2004

(Continued)

OTHER PUBLICATIONS

"Physics for Game Developers," by David M. Bourg, (c) 2002 O'Reilly, published Nov. 2001, chapters 5 and 13 on collisions.*

(Continued)

*Primary Examiner*—Peter DungBa Vo
*Assistant Examiner*—Matthew D. Hoel
(74) *Attorney, Agent, or Firm*—Finnegan, Henderson, Farabow, Garrett & Dunner, L.L.P.

(57) ABSTRACT

An object of the present invention is to impose a penalty on a player, without causing a sudden deceleration, when a moving body moving on a course formed in a virtual space contacts a sidewall at the edge of the course. To achieve this object, assume that a vehicle running on a course formed in a virtual space has contacted a sidewall at point A which corresponds to the $0^{th}$ frame. Whereupon, at point B which corresponds to the $1^{st}$ frame, an amount, Rf, is subtracted from vehicle speed V, and from the $2^{nd}$ frame until point C which corresponds to the $60t^{th}$ frame, processing to subtract RSd from vehicle speed V is successively performed.

11 Claims, 4 Drawing Sheets

U.S. PATENT DOCUMENTS

| | | | | | |
|---|---|---|---|---|---|
| 5,607,308 | A | * | 3/1997 | Copperman et al. | 434/62 |
| 5,623,642 | A | * | 4/1997 | Katz et al. | 703/7 |
| 5,625,575 | A | * | 4/1997 | Goyal et al. | 703/6 |
| 5,683,082 | A | * | 11/1997 | Takemoto et al. | 273/121 B |
| 5,785,630 | A | | 7/1998 | Bobick et al. | |
| 5,921,780 | A | * | 7/1999 | Myers | 434/69 |
| 5,959,613 | A | * | 9/1999 | Rosenberg et al. | 345/161 |
| 6,053,815 | A | * | 4/2000 | Hara et al. | 463/46 |
| 6,067,096 | A | * | 5/2000 | Nagle | 345/473 |
| 6,171,186 | B1 | * | 1/2001 | Kurosawa et al. | 463/31 |
| 6,203,426 | B1 | * | 3/2001 | Matsui et al. | 463/6 |
| 6,213,878 | B1 | * | 4/2001 | Setsumasa et al. | 463/31 |
| 6,222,546 | B1 | * | 4/2001 | Yokoyama et al. | 345/418 |
| 6,222,554 | B1 | * | 4/2001 | Berry et al. | 345/427 |
| 6,244,959 | B1 | * | 6/2001 | Miyamoto et al. | 463/31 |
| 6,278,439 | B1 | * | 8/2001 | Rosenberg et al. | 345/157 |
| 6,288,727 | B1 | * | 9/2001 | Akemann | 345/473 |
| 6,366,845 | B1 | * | 4/2002 | Kannonji | 701/96 |
| 6,417,854 | B1 | | 7/2002 | Isowaki et al. | |
| 6,422,939 | B1 | | 7/2002 | Koyama et al. | |
| 6,652,376 | B1 | * | 11/2003 | Yoshida et al. | 463/6 |
| 6,679,702 | B1 | * | 1/2004 | Rau | 434/29 |
| 6,752,716 | B1 | * | 6/2004 | Nishimura et al. | 463/6 |
| 2001/0008847 | A1 | * | 7/2001 | Miyamoto et al. | 463/33 |
| 2001/0016518 | A1 | * | 8/2001 | Nishiumi et al. | 463/36 |
| 2003/0153374 | A1 | * | 8/2003 | Gilmore | 463/6 |
| 2004/0113932 | A1 | * | 6/2004 | Rosenberg et al. | 345/701 |

FOREIGN PATENT DOCUMENTS

| | | | |
|---|---|---|---|
| EP | 1 029 569 A2 | * | 8/2000 |
| EP | 1029569 A | | 8/2000 |
| JP | 08-332280 A | * | 12/1996 |
| JP | 11-114225 A | * | 4/1999 |
| KR | 1999-45467 | | 6/1999 |

OTHER PUBLICATIONS http://www.oreilly.com/catalog/physicsgame, downloaded Jan. 6, 2006, establishing publication date of Nov. 2001.*

Manuals for "BMX Simulator," "Top Gear Overdrive," "Power Drive Rally," "Excitebike," "Driving Emotion Type-S," and "Driver," downloaded from www.planetmirror.com/pub/replacementdocs/, downloaded Jul. 24, 2007.*

"Building a 3D Game Engine in C++," by Brian Hook, 1995, John Wiley & Sons, New York, chapter 14.*

"Game Programming Gems," by Mark DeLoura, 2000, Charles River Media, Inc., Hingham, Mass., chapters 2.2, 4.5, and 4.6.*

"Physics for Scientists and Engineers," by Douglas Giancoli, 2000, Prentice Hall, Upper Saddle River, N.J., chapters 5 and 9.*

"Auto Racing," manual for Intellivision game console, downloaded from www.planetmirror.com/pub/replacementdocs/, Jul. 24, 2007.*

"Checkered Flag," manual for Atari Jaguar-game console, downloaded form www.planetmirror.com/pub/replacementdocs/, Jul. 24, 2007.* dictionary.com definition of "running load."*

Machine translation of JP 08-332280 A, downloaded from http://dossier1.ipdl.inpit.go.jp/AIPN/odse_top_dn.ipdl?N0000=7400, Aug. 29, 2008.*

English language abstract of JP 2001 120837, published May 8, 2001.

English language abstract of JP 11 143353 A, published May 28, 1999.

English language abstract of JP 07 116353 A, published May 9, 1995.

Partial European Search Report issued Dec. 2, 2004 in European application No. 02256504.

Notification of First Office Action from the Chinese Patent Office dated Sep. 8, 2006 (5 pages).

* cited by examiner

COMPUTER PROGRAM PRODUCT

BACKGROUND OF THE INVENTION

1. Field of the Invention

The present invention relates to a computer program product in which a game program is recorded whereby the game develops as a moving body moves on a course formed in a virtual space, in response to manipulation by a player.

2. Description of the Related Art

Conventionally, game apparatuses are proposed whereby, for a virtual vehicle running on a course formed in a virtual space, the pitch angle, yaw angle, roll angle, running speed, acceleration, etc. of the vehicle are simulated from its movement, acceleration, road surface resistance, centrifugal force, moment of inertia, etc., in response to the player's inputted manipulations of the steering wheel, accelerator, brakes, gear shift, etc. By displaying the resulting vehicle movement on the game screen, a racing game is developed. In such racing games, sidewalls are provided, such as fences, guard rails, concrete walls, etc. on the edge of the course, as the vehicles race along on the course.

However, with conventional game equipment, as shown in FIGS. 5 and 6, players, in order to travel the shortest possible course, can ram their vehicle 40 into sidewall 51 on the inner side of a corner and skillfully make it slide in contact therewith, thus causing vehicle 40 to decelerate due to the resistance from friction with sidewall 51, enabling very fast cornering. This cheating technique, based on "insider knowledge," has become widespread among advanced players. Taking advantage of this technique, a racing technique becomes possible which could never exist with a real vehicle and, however much one says "it's a game," this technique is not desirable in a race game which faithfully simulates the movement of an actual vehicle.

For this reason, conventional game equipment is programmed such that, in the case that vehicle 40 comes into contact with sidewall 51, the speed of vehicle 40 decelerates. FIG. 7 shows the flow chart which describes the deceleration processing for vehicle 40 that occurs when vehicle 40 comes into contact with sidewall 51. As shown in the same figure, with a conventional game program, vehicle 40 running processing (S20) is done, and if it is detected (S21; YES) that vehicle 40 has made contact with sidewall 51, deceleration processing (S22) of speed V of vehicle 40 is done by the amount of Rf. If vehicle 40 contacts sidewall 51 at point A, then through this deceleration processing, as shown in FIG. 8, in the frame (frame 1) following the frame (frame 0) displayed at the time of contact, an image is displayed of vehicle 40 passing point B at a speed of V-Rf. Since images are displayed on the display at the rate of 60 frames per second, vehicle 40, by contacting sidewall 51, undergoes a sudden deceleration of vehicle speed in the interval of one frame.

However, if for the purpose of detering the above mentioned "insider technique," vehicle speed is caused to decelerate suddenly when vehicle 40 contacts sidewall 51, that can cause the fresh feeling of the game to be lost and is thus undesirable. In particular, if, to control use of the above-mentioned insider technique by advanced players, a sudden and large deceleration is applied as the penalty when the sidewall is contacted, beginners will be negatively impacted. Beginners, because of their undeveloped skill level, may contact the sidewall through a mistake in vehicle operation. Thus, if even in such cases beginners are subjected to the same kind of penalty, that may cause them to lose their zest for game play. Thus, what is desired is development of a technology which controls the insider technique of advanced players, while maintaining exciting race development to stimulate the enthusiasm of beginners for the game play, even though they are not skilled in operation. In addition, even in cases where a shortcut is taken, driving off the course, if sudden deceleration is applied as the penalty, as described above, that results in spoiling the player's enthusiasm for play.

To deal with this, the present invention, for a game which has a moving body moving on a course formed in a virtual space, in response to manipulation by a player, provides a computer program product in which a game program is recorded which enables a penalty to be assessed when the moving body contacts the sidewall at the edge of the course, such penalty being applied through an appropriate means without causing sudden deceleration and without spoiling beginners' enthusiasm for play.

SUMMARY OF THE INVENTION

The computer program product of the present invention which seeks to solve the above-mentioned problem is a computer program product in which a program for causing execution of game processing by a computer system is recorded on a computer-readable recording medium. The above-mentioned computer program is one which causes execution of the following steps: the step of causing a moving body to move on a course formed in a virtual space, in response to manipulation by a player; the step of determining the total amount of running load to be applied to above-mentioned moving body when above-mentioned moving body contacts the partition-indicating body formed at the edge of the course to separate the area within the course from the area outside; and the step of dividing above-mentioned running load on a per unit time basis or per unit distance basis and allocating the divided load for each unit time or unit distance over a specific time or specific distance when above-mentioned moving body moves after contacting the partition-indicating body. In this way, if a moving body moving on a course contacts the sidewall at the edge of the course, it is possible to apply a penalty to the player, without a sudden deceleration.

DESCRIPTION OF THE PREFERRED EMBODIMENTS

Below, embodiments are described while referring to the figures.

Figure 1:
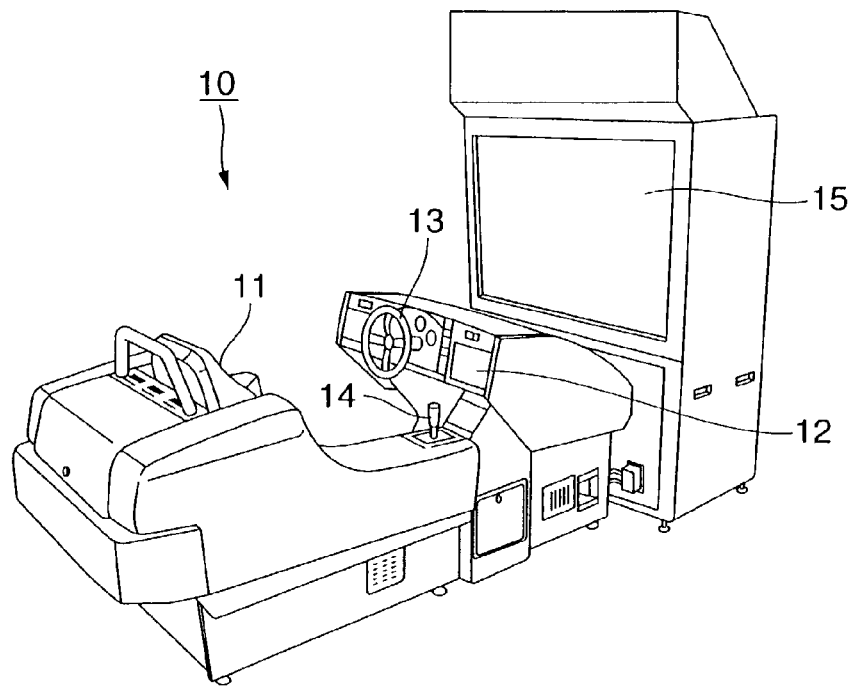
FIG. 1 shows an external view of the configuration of a game apparatus according to the present invention.

FIG. 1 shows a coin-operated game apparatus installed at an entertainment facility such as a game center. Game apparatus 10 is configured to comprise seat 11 on which the player sits; control panel 12 on which are positioned a speedometer, tachometer, etc.; steering wheel 12 for controlling the steering angle of the front wheels; gear shift lever 14 for performing gear shifting; and display 15 for displaying game scenes. The player sits in seat 11, and the race develops as the player operates steering wheel 13, accelerator, brake pedal, gear shift lever 14, etc. driving the vehicle on the course displayed on display 11.

Figure 2:
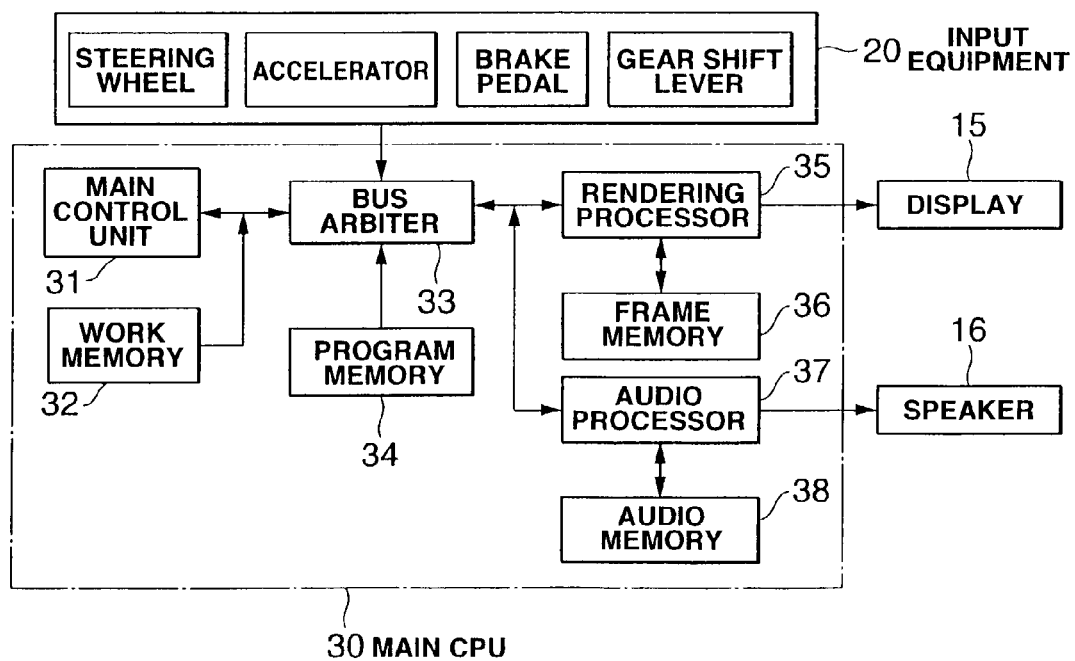
FIG. 2 shows a block diagram of a game apparatus according to the present invention.

FIG. 2 is a block diagram of game apparatus 10. Game apparatus 10 is primarily a computer system configured of input equipment 20, main control unit 30, display 15 and speaker 16. Input equipment 20 functions as a racing game operating means to be operated by the player and includes the steering wheel, accelerator, brake pedal, and gear shift lever. Operating signals are outputted from input equipment 20 to main control unit 30, and in main control unit 30 image data to be displayed on display 11 and sound data to be outputted from speaker 16 are generated. Control unit 30 includes main CPU 31, work memory 32, bus arbiter 33, program memory 34, rendering processor 35, frame memory 36, audio processor 37, and audio memory 38.

Operating signals are sent from input equipment 20 to main CPU 31 via bus arbiter 33. Main CPU 31 loads the game program from program memory 34 which stores the game program and develops the game in work memory 32. Then, based on each kind of operating signal outputted from input equipment 20 via bus arbiter 33, the image of the vehicle body which is to be formed in the virtual space is converted into an image as viewed from a specified viewpoint and plotting commands are issued to rendering processor 25. Rendering processor 35, following the plotting commands issued by main CPU 31, performs polygon rendering and, by means of double buffering, stores image data in frame memory 36 and also reads image data from frame memory 36, performs D/A conversion and displays the result on display 11. Audio processor 37, following sound commands issued from main CPU 31, generates sound data, writes it into audio memory 38, and also reads audio data from audio memory 38, performs D/A conversion and outputs the result from speaker 16.

Figure 3:
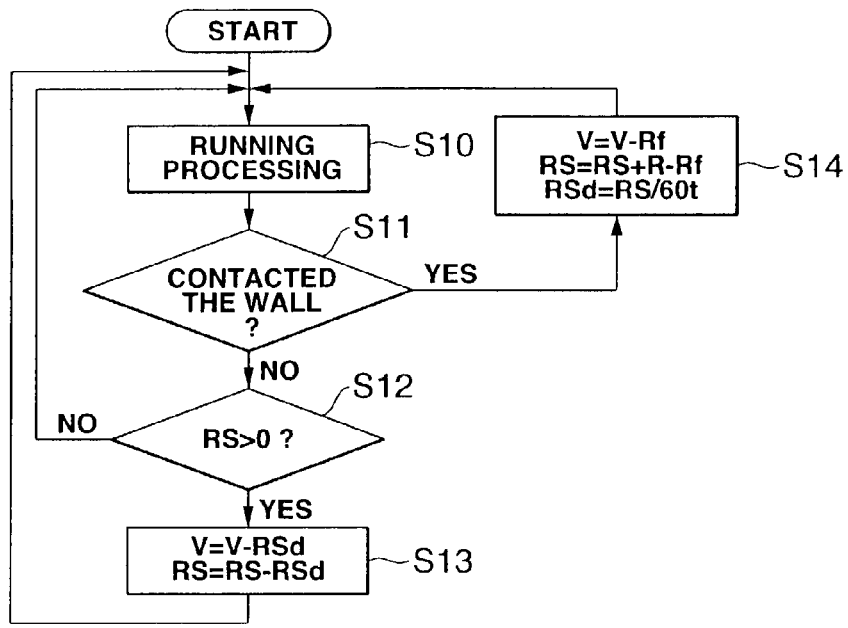
FIG. 3 is a flow chart indicating the vehicle deceleration processing.

FIG. 3 is a flow chart indicating vehicle deceleration processing in a race game when vehicle 40 contacts sidewall 51 which is formed along the edge of course 50 and partitions the inside of the course from the outside. Main CPU 31 performs processing for normal vehicle running (S10) for the race game, and when the CPU determines that vehicle 40 has collided with sidewall 51 built at the edge of the course (S11), the CPU calculates deceleration parameters Rf and RS from the vehicle speed at the time of collision, the sidewall hardness (that unique hardness of a concrete wall, fence, or etc.) the contact angle at the time of collision, the vehicle weight, etc., and performs calculation (S14) of V=V-Rf, RS=RS+R-Rf, and RSd=RS/60 t. Here, Rf is the deceleration resistance at the time of the collision, RS is the sum of the deceleration resistance applied to vehicle 40 due to the collision with sidewall 51, V is the vehicle speed of vehicle 40, t is the time duration for application of the deceleration resistance (for example, 10 seconds).

On the other hand, in the case that vehicle 40, running on course 50, does not contact sidewall 51, that is, when (S11: NO), RS>0, then (S12: YES) and RSd is deducted from vehicle speed V and RSd is deducted from RS (S13). Because steps S10 through S14 are executed for each frame, once vehicle 40 collides with sidewall 51, processing step S13 is repeated for each frame until RS becomes 0, and upon each repetition, RSd is subtracted from V. If the time for RS to reach 0 is set at t, the steps S10 through S14 will be repeated 60 t times.

Figure 4:
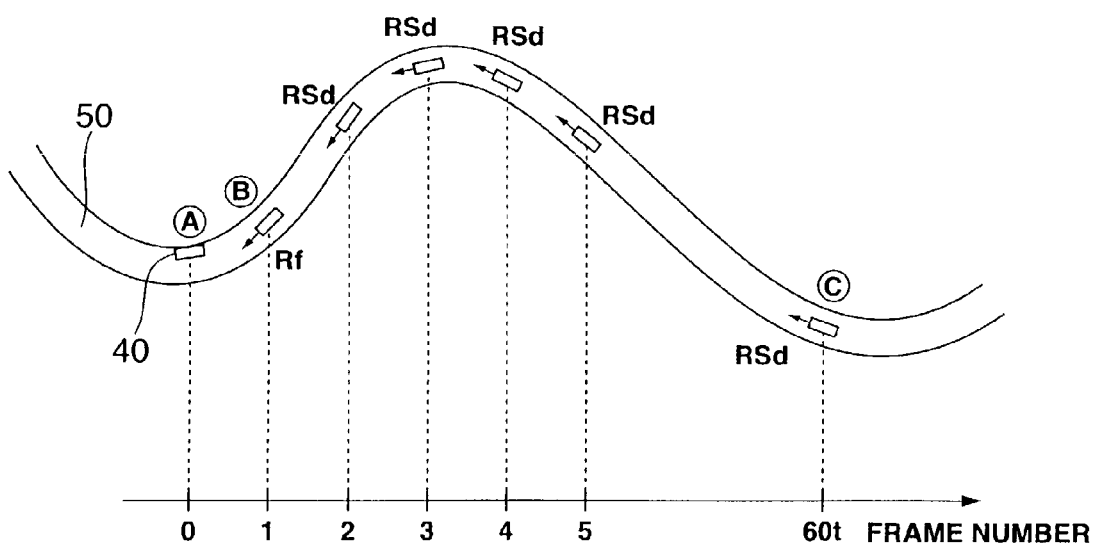
FIG. 4 is an explanatory diagram of the vehicle deceleration processing.
Figure 5:
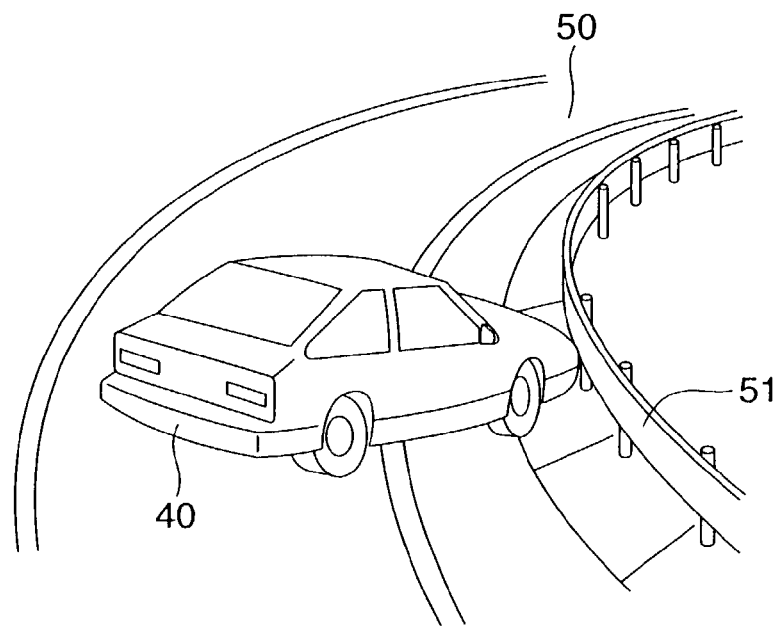
FIG. 5 is an example of a game screen.
Figure 6:
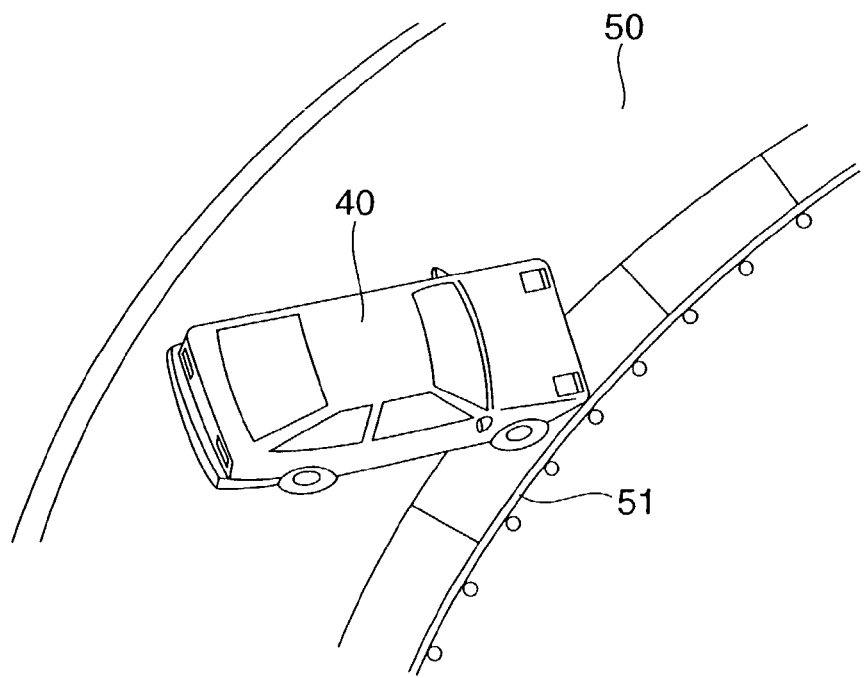
FIG. 6 is an example of a game screen.
Figure 7:
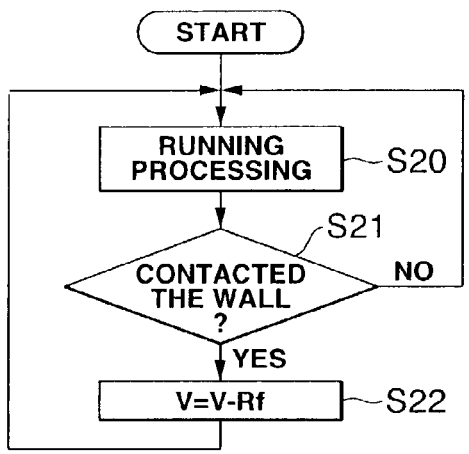
FIG. 7 is a flow chart indicating the vehicle deceleration processing.
Figure 8:
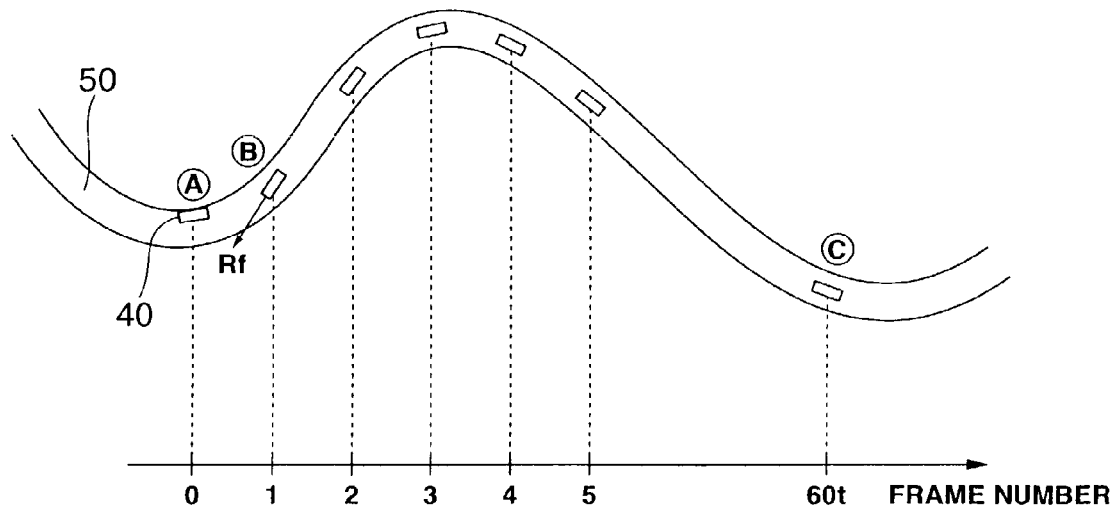
FIG. 8 is an explanatory diagram of the vehicle deceleration processing.

An explanation of above-mentioned deceleration processing with reference to FIG. 4 is as follows. Assume that vehicle 40 running on course 50 contacted sidewall 51, which is at the edge of the course, at point A (S11: YES). If the frame number of the frame displayed at that time is taken as frame 0, at point B, which corresponds to 1 frame, deceleration resistance Rf will be subtracted from vehicle speed V (S14). In addition, RS is found from road surface resistance R of course 50 and deceleration resistance Rf (S14). Then, in order to drive vehicle 40 on course 50, over the span from 2 frame to point C at 60 t frame, without contacting sidewall 51 (S11: NO), in each frame, RSd is successively subtracted from vehicle speed V (S13). In other words, RSd is successively subtracted from the vehicle speed V at each unit time which would normally have been obtained from the combined force of the positive acceleration force due to the amount of the player's application of the accelerator and the negative acceleration force due to various kinds of resistance to vehicle running such as road surface resistance, air resistance, etc. if sidewall 51 had not been contacted. Afterward, at point C, corresponding to 60 t frame, RS becomes 0 and the deceleration processing steps are completed.

In this way, when vehicle 40 contacts sidewall 51, the deceleration resistance which vehicle 40 receives is applied by being allocated to each frame across 60 t frames. As a result, a penalty can be assessed while avoiding sudden deceleration caused by collision with sidewall 51 and without consequently losing the freshness of the race game.

Note that in the above-mentioned example, a configuration was shown in which a fixed amount of speed was subtracted from vehicle speed in each frame unit, as an example, but the present invention is not limited to this. For example, acceleration could be reduced by making it so that even if the player pushed on the accelerator, vehicle 40 would not accelerate for a set time interval; an upper limit could be placed on movement acceleration; the road surface resistance of course 50 could be increased; air resistance could be increased; the running functionality of vehicle 40 could be reduced; or, through any other means, a configuration could be made which applies a running load during a fixed time interval. In addition, in the above-mentioned example, a case was shown in which a running load was applied, allocated to each frame (each time unit), spanning 60 t frames, but the present invention is not limited to this. For example, a configuration could be made in which the total amount of running load was divided and allocated to each distance unit traveled by the moving body. In addition, it is not necessary that the running load (the divided running load units) applied to the moving body all be applied uniformly; it may instead be arranged that the running load applied to moving body 40 immediately after moving body 40's contact with sidewall 51 is made to be large, and each time moving body 40 moves for a certain number of time units (or over a certain number of distance units), the running load is gradually decreased.

Further, as a variation of the above-described embodiment, main CPU 31 may configured to determine player skill level from player's lap time, number of crashes, number of times another vehicle is overtaken, average speed, vehicle speed when it contacts sidewall 51 (or when the vehicle runs off the course), angle of impact when it collides with sidewall 51, angle at which it runs off the course whenever that event occurs, etc. Then the CPU may be configured to determine the value of RS, the deceleration parameter, and t, the time until RS goes to 0, based on that skill level.

Main CPU 31 can change the degree of the penalty depending on skill level by establishing large values of RS and t for the case that an advanced player contacts sidewall 51 or runs off the course and small values of RS and t for the case of a beginner. To do this, the CPU considers as "advanced players" those "players who have the best lap time," "players who have a small number of crashes," "players who often overtake other vehicles," "players with high average speed," "players whose vehicle speed is high when they contact sidewall 51 (or, when they run off the course)," "players whose speed is high when cornering," "players whose angle of impact with the sidewall is shallow," and "players who have a high running position or ranking when several players race." In this way, the CPU functions as a skill level determining means and a running load determining means, and in the case that player skill level is above a certain level, that player is judged an "advanced player," while in the case that player skill level does not meet that level, that player is judged a "beginning player." Then the CPU determines the running load depending on the skill level of the player.

In addition, in the above-mentioned example, deceleration processing for the case that vehicle 40 contacts sidewall 51 was explained, but the present patent is not limited to this; deceleration processing can also be applied to the case that vehicle 40 runs off the course. In this case the conditions must be established that no sidewall 51 is provided on course 50 and vehicle 40 can run outside the course. In a race game, if an advanced player, trying to shorten his lap time, intentionally (or a beginner, through mistaken operation of the steering wheel) short cuts the inside of the corner and runs outside of course 50, main CPU 31 calculates the running distance, from the travel path which vehicle 40 ran outside the course, and also calculates, from the number of frames plotted, the running time. Main CPU 31 functions as a running load determining means and determines, from the running distance and running time which occurred outside the course, values for RS and t which are the deceleration parameters.

These deceleration parameters should make the running load bigger the longer the running distance and running time occurring outside the course, thus applying a larger penalty to the player, so it is preferable that the values of RS and t should both be set to large values. Additionally, the difference between the running distance of vehicle 40 when it ran on the short cut and shortest distance on the course connecting the two endpoints of the course part which was bypassed may be found and the values of RS and t set corresponding to the size of that difference. When vehicle 40 returns to the course, main CPU 31 divides deceleration resistance RSd on a per-frame basis an applies it to vehicle 40 in each frame until RS reaches 0. The specific steps of deceleration processing are done in the same manner as the example explained above (FIG. 3 and FIG. 4). As examples of a running load, processing such as subtracting a fixed amount of speed during each time unit, or limiting acceleration to a fixed limit, or limiting the maximum value of vehicle speed may be done. According to this processing, once a vehicle 40 runs off the course, the penalty according to the running distance traveled or running time is applied in small increments after the vehicle has returned to the track. Thus there is no sudden deceleration when a vehicle goes off the course, and short cut operations of advanced players can be effectively controlled without spoiling the beginner's enthusiasm for play.

In addition, the game program which performs the above-mentioned deceleration processing can be recorded in a computer-readable recording medium and distributed in the market. As examples of this kind of recording medium, there are optical recording media (recording media from which data may be read optically, such as CD-RAM, CD-ROM, DVD-RAM, DVD-ROM, DVD-R, PD disk, MD disk, MO disk, etc.); magnetic recording media (recording media from which data may be read magnetically, such as flexible disk, magnetic card, magnetic tape, etc.); memory cartridges having memory elements (semiconductor memory elements such as DRAM's, and high dielectric memory elements, such as FRAM's); etc.

In addition, this kind of game program can be delivered "on-demand" from a network server, such as a Web server, etc., in response to a request from a client device (personal computer, game machine, portable information terminal, etc.) connected to the Internet or to an open network, such as a packet communication network, etc. Further, as for types of games, these need not be limited to car race games, but the invention may also be applied to motorbike races, bicycle races, motor boat races, etc. As for types of moving bodies, these may include vehicles in which people ride, such as automobiles, motorbikes, bicycles, boats, airplanes, space craft, ships, wagons, tractors, tanks, etc., but may also include people, animals, monsters, spacemen, plants, fish, birds and insects, and also characters representing them, etc. In this way, any character which can run on a course formed in any desired virtual space on land, in water, in the ground, in space, etc. is acceptable.

By means of this invention, in the event that a moving body, moving on a course formed in a virtual space contacts the sidewall at the edge of the course or runs off the course, the penalty assessed to the player can be divided and applied on a per unit time basis. As a result, the same penalty amount as with conventional games can be gradually applied, without a sudden deceleration, and in this way the "insider techniques" of advanced players can be effectively controlled without spoiling the play enthusiasm of beginners.

What is claimed is:

1. A computer program product in which computer-readable instructions that, when executed by a computer, perform a game processing are recorded on a computer-readable recording medium, the computer-readable instructions comprising:

instructions for setting a course having a sidewall disposed along at least a portion of the edge of the course in a virtual space;

instructions for receiving a player's instructions from an input device;

instructions for, based on a predetermined view point in the virtual space, generating image data of a virtual moving object traveling on the course at a predetermined speed, in response to the player's instructions;

instructions for displaying a game video image on a display based on the image data;

instructions for determining whether the virtual moving object comes into contact with the sidewall;

instructions for calculating, based on at least a current speed of the virtual moving object at the time when the contact occurs, a total deceleration amount for the virtual moving object if the virtual moving object has been determined to have contacted the sidewall;

instructions for calculating a unit deceleration amount by dividing the total deceleration amount by a predetermined unit of time or distance;

instructions for determining whether deceleration processing is required based on the total deceleration amount if the virtual moving object is not in contact with the sidewall; and instructions for executing the deceleration processing if the deceleration processing was determined to be required, wherein the deceleration processing includes instructions for, based on the unit deceleration amount, updating the current speed of the virtual moving object such that the virtual moving object traveling on the course decelerates and updating the total deceleration amount such that the total deceleration amount is decreased, and wherein the current speed of the virtual moving object gradually decreases depending on the predetermined unit.

2. The computer program product of claim 1, wherein the course has at least a curve, and wherein the sidewall is disposed along an inner edge of the curve.

3. The computer program product according to claim 1, wherein the virtual moving object moves only on the course and does not deviate from the course.

4. The computer program product according to claim 1, wherein the unit deceleration amount is calculated by dividing the total deceleration amount on a per distance basis.

5. A computer program product in which computer-readable instructions that, when executed by a computer, perform a game processing are recorded on a computer-readable recording medium, the computer-readable instructions comprising:

instructions for setting a course have a sidewall disposed along at least a portion of the edge of the course in a virtual space;

instructions for receiving a player's instructions from an input device;

instructions for, based on a predetermined view point in the virtual space, generating image data of a virtual moving object traveling on the course at a predetermined speed, in response to the player's instructions;

instructions for determining a skill level of the player;

instructions for displaying a game video image on a display based on the image data;

instructions for determining whether the virtual moving object comes into contact with the sidewall;

instructions for calculating, based on at least a current speed of the virtual moving object at the time when the contact occurs and based on the skill level of the player, a total deceleration amount for the virtual moving object if the virtual moving object has been determined to have contacted the sidewall;

instructions for calculating a unit deceleration amount by dividing the total deceleration amount by a predetermined unit of time or distance;

instructions for determining whether deceleration processing is required based on the total deceleration amount if the virtual moving object is not in contact with the sidewall; and instructions for executing the deceleration processing if the deceleration processing was determined to be required, wherein the deceleration processing includes instructions for, based on the unit deceleration amount, updating the current speed of the virtual moving object such that the virtual moving object traveling on the course decelerates and updating the total deceleration amount such that the total deceleration amount is decreased, and wherein the current speed of the virtual moving object gradually decreases depending on the predetermined unit.

6. The computer program product according to claim 5, wherein the unit deceleration amount is calculated by dividing the total deceleration amount on a per distance basis.

7. A computer program product in which computer-readable instructions that, when executed by a computer, perform a game processing are recorded on a computer-readable recording medium, the computer-readable instructions comprising:

instructions for setting a course having a sidewall disposed along at least a portion of the edge of the course in a virtual space;

instructions for receiving a player's instructions from an input device;

instructions for, based on a predetermined view point in the virtual space, generating image data of a virtual moving object on a course at a predetermined speed, in response to the player's instructions;

instructions for determining a skill level of the player based on any of an average moving speed, running position, lap time, angle of impact to the sidewall, number of times of overtaking other moving bodies, or number of crashes of the moving body;

instructions for displaying a game video image on a display based on the image data;

instructions for determining whether the virtual moving body comes into contact with the sidewall;

instructions for calculating, based on at least a current speed of the virtual moving object at the time when the contact occurs and based on the skill level of the player, a total deceleration amount for the virtual moving object if the virtual moving object has been determined to have contacted the sidewall;

instructions for calculating a unit deceleration amount by dividing the total deceleration amount by a predetermined unit of time or distance;

instructions for determining whether deceleration processing is required based on the total deceleration amount if the virtual moving object is not in contact with the sidewall; and instructions for executing the deceleration processing if the deceleration processing was determined to be required, wherein the deceleration processing includes instructions for, based on the unit deceleration amount, updating the current speed of the virtual moving object such that the virtual moving object traveling on the course decelerates and updating the total deceleration amount such that the total deceleration amount is decreased, and wherein the current speed of the virtual moving object gradually decreases depending on the predetermined unit.

8. A computer program product in which computer-readable instructions that, when executed by a computer, perform a game processing are recorded on a computer-readable recording medium, the computer-readable instructions comprising:

instructions for setting a course having a sidewall disposed along at least a portion of the edge of the course in a virtual space;

instructions for receiving a player's instructions from an input device;

instructions for, based on a predetermined view point in the virtual space, generating image data of a virtual moving object travelling on the course at a predetermined speed, in response to the player's instructions;

instructions for determining a skill level of the player;

instructions for displaying a game video image on a display based on the image data;

instructions for determining whether the virtual moving object comes into contact with the sidewall;

instructions for calculating, on a condition that the skill level of the player exceeds a predetermined level, and based on at least a current speed of the virtual moving object at the time when the contact occurs, a total deceleration amount for the virtual moving object if the virtual moving object has been determined to have contacted the sidewall;

instructions for calculating a unit deceleration amount by dividing the total deceleration amount by a predetermined unit of time or distance;

instructions for determining whether deceleration processing is required based on the total deceleration amount if the virtual moving object is not in contact with the sidewall; and instructions for executing the deceleration processing if the deceleration processing was determined to be required, wherein the deceleration processing includes instructions for, based on the unit deceleration amount, updating the current speed of the virtual moving object such that the virtual moving object traveling on the course decelerates and updating the total deceleration amount such that the total deceleration amount is decreased, and wherein the current speed of the virtual moving object gradually decreases depending on the predetermined unit.

9. A computer program product in which computer-readable instructions that, when executed by a computer, perform a game processing are recorded on a computer-readable recording medium, the computer-readable instructions comprising:

instructions for setting a course having a sidewall disposed along at least a portion of the edge of the course in a virtual space;

instructions for receiving a player's instructions from an input device;

instructions for, based on a predetermined view point in the virtual space, generating image data of a virtual moving object travelling on the course at a predetermined speed, in response to the player's instructions;

instructions for determining a skill level of the player;

instructions for displaying a game video image on a display based on the image data;

instructions for determining whether the virtual moving object comes into contact with the sidewall;

instructions for calculating, on a condition that the skill level of the player does not exceed a predetermined level, based on at least a current speed of the virtual moving object at the time when the contact occurs, a total deceleration amount for the virtual moving object if the virtual moving object has been determined to have contacted the sidewall;

instructions for calculating a unit deceleration amount by dividing the total deceleration amount by a predetermined unit of time or distance;

instructions for determining whether deceleration processing is required based on the total deceleration amount if the virtual moving object is not in contact with the sidewall; and instructions for executing the deceleration processing if the deceleration processing was determined to be required, wherein the deceleration processing includes instructions for, based on the unit deceleration amount, updating the current speed of the virtual moving object such that the virtual moving object traveling on the course decelerates and updating the total deceleration amount such that the total deceleration amount is decreased, and wherein the current speed of the virtual moving object gradually decreases depending on the predetermined unit.

10. The computer program product according to any of claims 5, 7, 8, and 9, wherein the virtual moving object moves only on the course and does not deviate from the course.

11. A method for executing game processing in a virtual space, comprising:

setting a course having a sidewall disposed along at least a portion of the edge of the course in the virtual space;

receiving a player's instructions from an input device;

generating, based on a predetermined view point in the virtual space, image data of a virtual moving object traveling on the course at a predetermined speed, in response to the player's instructions;

displaying, by a processor, a game video image on a display based on the image data;

determining whether the virtual moving object comes into contact with the sidewall;

calculating, by the processor, based on at least a current speed of the virtual moving object at the time when the contact occurs, a total deceleration amount for the virtual moving object if the virtual moving object has been determined to have contacted the sidewall;

calculating, by the processor, a unit deceleration amount by dividing the total deceleration amount by a predetermined unit of time or distance;

determining, by the processor, whether deceleration processing is required based on the total deceleration amount if the virtual moving object is not in contact with the sidewall; and executing, by the processor, the deceleration processing if the deceleration processing was determined to be required, wherein the deceleration processing includes instructions for, based on the unit deceleration amount, updating the current speed of the virtual moving object such that the virtual moving object traveling on the course decelerates and updating the total deceleration amount such that the total deceleration amount is decreased, and wherein the current speed of the virtual moving object gradually decreases depending on the predetermined unit.

* * * * *